United States Patent [19]

Sogawa et al.

[11] Patent Number: 4,894,595
[45] Date of Patent: Jan. 16, 1990

[54] INDUSTRIAL ROBOT

[75] Inventors: Kenji Sogawa; Makoto Doi; Mikio Hasegawa, all of Osaka, Japan

[73] Assignee: Matsushita Electric Industrial Co., Ltd., Osaka, Japan

[21] Appl. No.: 178,165

[22] Filed: Apr. 6, 1988

[30] Foreign Application Priority Data

Apr. 8, 1987 [JP] Japan .................................. 62-86045

[51] Int. Cl.$^4$ ............................................ G05B 19/42
[52] U.S. Cl. .......................... 318/568.24; 318/568.16; 318/567; 318/568.1; 364/513; 901/20; 901/23
[58] Field of Search ........................ 318/632, 560–513; 364/513; 901/3, 9, 15, 16, 17, 18, 19, 20, 21, 22, 23, 24

[56] References Cited

U.S. PATENT DOCUMENTS

| 4,530,062 | 7/1985 | Inaba et al. | 318/568 B |
| 4,600,869 | 7/1986 | Sekine et al. | 318/568 B |
| 4,638,221 | 1/1987 | Brignall | 318/632 |

FOREIGN PATENT DOCUMENTS

| 0159131 | 10/1985 | European Pat. Off. |
| 59-220806 | 12/1984 | Japan . |
| 60-254209 | 12/1985 | Japan . |
| 2169536 | 7/1986 | United Kingdom . |

Primary Examiner—William M. Shoop, Jr.
Assistant Examiner—Paul Ip
Attorney, Agent, or Firm—Lowe, Price, LeBlanc, Becker & Shur

[57] ABSTRACT

An industrial robot includes a movable arm and an electric motor driving the arm. A current flowing through the motor is controlled so that the arm is moved into predetermined positions and is balanced in the predetermined positions sequentially. A device memorizes values of the motor current at which the arm is balanced in the respective predetermined positions. A target value of the motor current is calculated on the basis of the memorized motor current values. The target motor current value allows the arm to be balanced in a given position.

12 Claims, 4 Drawing Sheets

INDUSTRIAL ROBOT

BACKGROUND OF THE INVENTION

This invention relates to an industrial robot usuable in factory automation and others.

Some robots have an arm and a hand carried on an end of the arm. Motors drive the arm and vary the position of the hand. The weight of the arm causes loads on the motors which vary as a function of the position or angle of the arm. Therefore, the weight of the arm tends to adversely affect the control of the position of the hand. As suggested from the above description, the weight of the arm, that is, the gravity, adversely affects various controls of the robot.

SUMMARY OF THE INVENTION

It is an object of this invention to provide an excellent industrial robot.

It is another object of this invention to provide an industrial robot which operates reliably independent of the gravity.

In accordance with a first aspect of this invention, an industrial robot includes a movable arm and an electric motor driving the arm. A current flowing through the motor is controlled so that the arm is moved into predetermined positions and is balanced in the predetermined positions sequentially. A device memorizes values of the motor current at which the arm is balanced in the respective predetermined positions. A target value of the motor current is calculated on the basis of the memorized motor current values. The target motor current value allows the arm to be balanced in a given position.

In accordance with a second aspect of this invention, an industrial robot includes a movable arm and an electric motor driving the arm. A current flowing through the motor is controlled so that the arm is moved into predetermined positions and is balanced in the predetermined positions sequentially. A device memorizes values of the motor current at which the arm is balanced in the respective predetermined positions. A target value of the motor current is calculated on the basis of the memorized motor current values. The target motor current value allows the arm to be balanced in a given position. When the arm holds a load, a device detects an actual value of the motor current at which the arm with the load is balanced in the given position. The target and actual motor current values are compared. The memorized motor current values are corrected in accordance with the comparison between the target and actual motor current values.

In accordance with a third aspect of this invention, an industrial robot includes a movable arm and an electric motor driving the arm. A current flowing through the motor is controlled so that the arm is moved into predetermined positions and is held in the predetermined positions sequentially. A device memorizes values of the motor current at which the arm is held in the respective predetermined positions. A relationship between an arbitrary position of the arm and a corresponding target value of the motor current is determined in accordance with the memorized motor current values and the predetermined positions. The target motor current value allows the arm to be balanced in the arbitrary position.

In accordance with a fourth aspect of this invention, an industrial robot includes a movable arm and an electric motor driving the arm. A current flowing through the motor is controlled so that the arm is moved into predetermined positions and is balanced in the predetermined positions sequentially. A device memorizes values of the motor current at which the arm is balanced in the respective predetermined positions. Thus, the device holds a table in which the motor current values are plotted as a function of the position of the arm. A target value of the motor current which allows the arm to be balanced in a given position is determined by referring to the table.

DESCRIPTION OF THE PREFERRED EMBODIMENT

Figure 1:
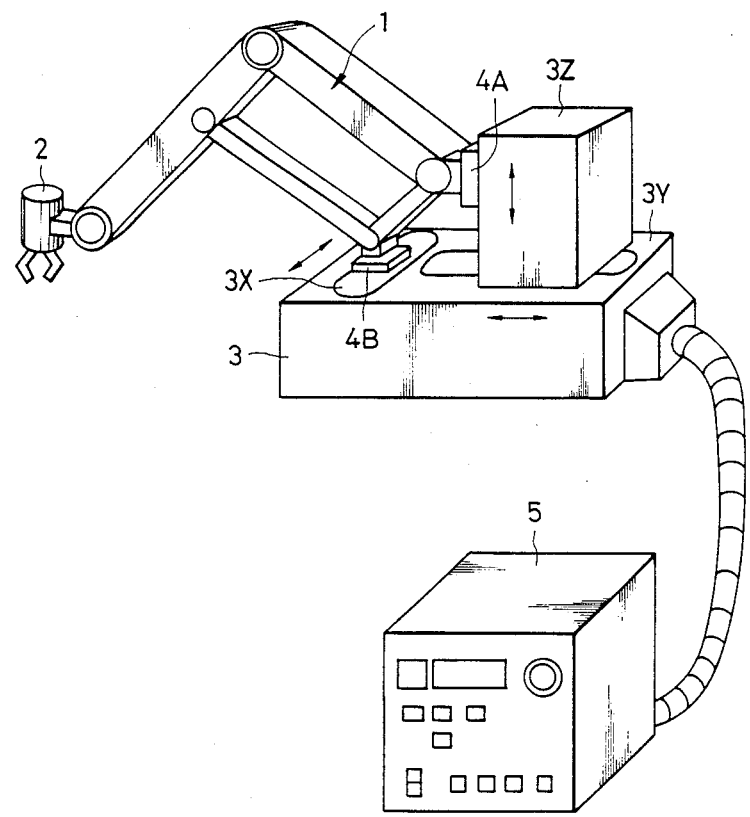
FIG. 1 is a perspective view of an industrial robot according to an embodiment of this invention.
Figure 2:
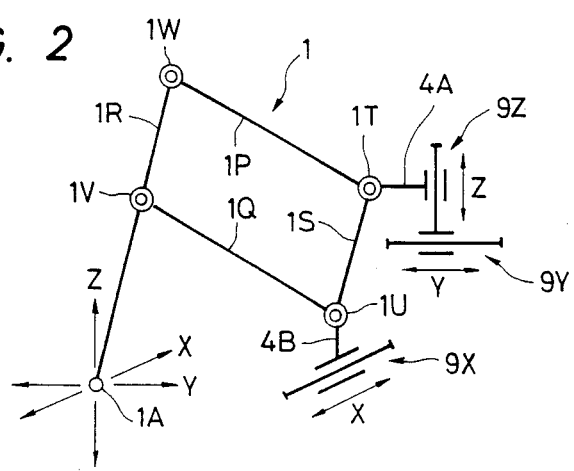
FIG. 2 is a diagram of the robot of FIG. 1.

With reference to FIGS. 1 and 2, an industrial robot has an arm arrangement 1 and a hand 2 carried on a free end 1A of the arm arrangement 1. The arm arrangement 1 is supported on a base 3. Drive units 3X and 3Y are supported within the base 3. A drive unit 3Z is supported on the base 3. The drive units 3X, 3Y, and 3Z include linear DC motors 9X, 9Y, and 9Z respectively.

The arm arrangement 1 is connected to an output shaft of the motor 9Z of the drive unit 3Z via a driven member 4A. The arm arrangement 1 is also connected to an output shaft of the motor 9X of the drive unit 3X via a driven member 4B. The drive unit 3Z is connected to an output shaft of the motor 9Y of the drive unit 3Y so that the arm arrangement 1 is connected to the drive unit 3Y.

The arm arrangement 1 includes a parallelogrammic linkage having arms 1P, 1Q, 1R, and 1S. The opposing arms 1P and 1Q extend in parallel. The other opposing arms 1R and 1S extend in parallel. The arms 1P–1S are pivotally connected at corners 1T, 1U, 1V, and 1W of the prallelogram of the linkage. The right-hand upper corner 1T of the linkage is pivotally connected to the driven member 4A. The right-hand lower corner 1U of the linkage is pivotally connected to the driven member 4B. The arm 1R projects from the parallelogram of the linkage and terminates at the free end 1A of the arm arrangement 1.

The output shafts of the motors 9X, 9Y, and 9Z are movable in respective linear directions X, Y, and Z perpendicular to each other. As the output shaft of the motor 9X moves, the arm arrangement end 1A and the hand 2 move in the X direction. Specifically, the position of the hand 2 in the X direction varies linearly with the position of the output shaft of the motor 9X. As the output shaft of the motor 9Y moves, the arm arrangement end 1A and the hand 2 move in the Y direction. Specifically, the position of the hand 2 in the Y direction varies linearly with the position of the output shaft of the motor 9Y. As the output shaft of the motor 9Z moves, the arm arrangement end 1A and the hand 2 move in the Z direction. Specifically, the position of the hand 2 in the Z direction varies linearly with the position of the output shaft of the motor 9Z.

The power outputs of the motors 9X-9Z depend on the amplitudes of currents supplied to the motors 9X-9Z respectively. Specifically, the power outputs of the motors 9X-9Z are proportional to the amplitudes of currents supplied to the motors 9X-9Z respectively.

The drive units 3X-3Z include linear encoders or sensors (not shown in FIGS. 1 and 2) detecting the positions of the output shafts of the motors 9X-9Z respectively. Since the position of the hand 2 depends on the positions of the output shafts of the motors 9X-9Z, output signals from the position sensors represent the position of the hand 2.

A control unit 5 is electrically connected to the motors of the drive units 3X-3Z via a cable (no reference character) so that electrical control signals are supplied from the control unit 5 to the motors 9X-9Z. The position sensors within the drive units 3X-3Z are electrically connected to the control unit 5 via the cable so that the output signals from the position sensors are transmitted to the control unit 5.

Figure 3:
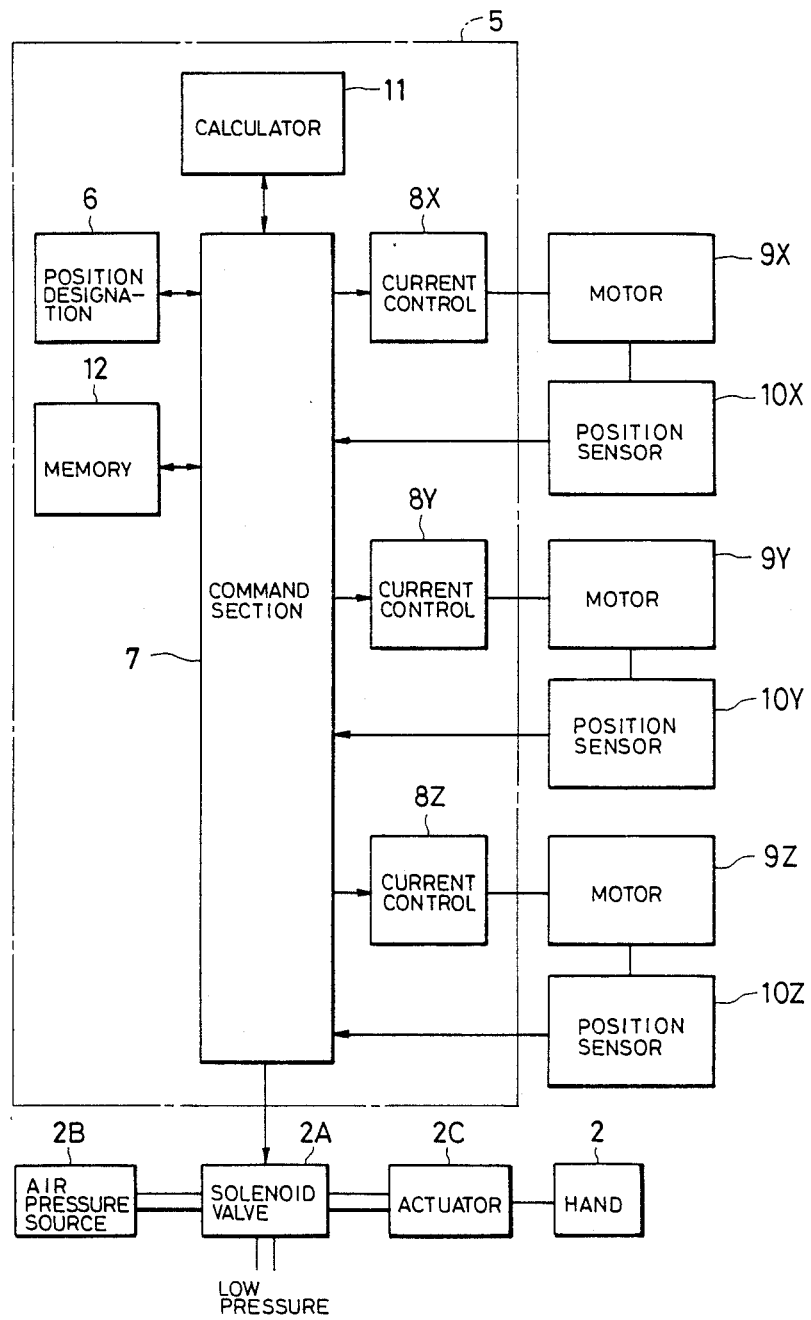
FIG. 3 is a block diagram of an electric part of the robot of FIG. 1.

As shown in FIG. 3, the control unit 5 includes a position designation device 6 outputting a signal which represents predetermined target positions of the hand 2 in a given sequence. The position designation device 6 has a memory holding data of predetermined target positions of the hand 2. The predetermined target positions are sequentially selected and the corresponding signals are sequentially transferred from the memory. The control unit 5 also includes a command section 7 connected to the position designation device 6. The position designation device 6 and the command section 7 perform handshake so that the data of target positions are sequentially transferred from the device 6 to the section 7. A calculator 11 and a memory 12 are connected to the command section 7. Current controllers 8X, 8Y, and 8Z are connected to the command section 7. The current controllers 8X-8Z are also connected to the motors 9X-9Z respectively. The command section 7 outputs signals to the current controllers 8X-8Z which represent command values of currents passing through the motors 9X-9Z respectively. The current controllers 8X-8Z adjust the actual values of the motor currents to the command values of the motor currents respectively. Position sensors 10X, 10Y, and 10Z associated with the motors 9X, 9Y, and 9Z detect the positions of the output shafts of the motors respectively and output signals indicative thereof to the command section 7. The output signals of the position sensors 10X-10Z also represent the actual position of the hand 2.

The command section 7 is electrically connected to a solenoid valve 2A connected between an air pressure source 2B and a pressure-responsive actuator 2C. The actuator 2C is connected to the hand 2. The solenoid valve 2A selectively applies a high pressure and a low pressure to the actuator 2C, allowing the hand 2 to grasp and release a load or work piece. The solenoid valve 2A is driven in accordance with a control signal outputted from the command section 7.

Figure 4:
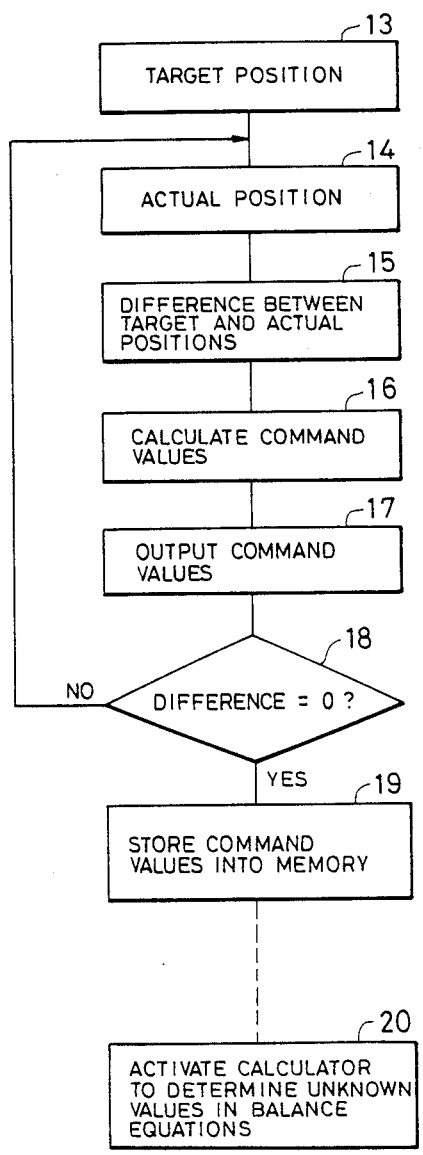
FIG. 4 is a flowchart of a program operating the command section of FIG. 3.

The command section 7 preferably includes a microcomputer having a combination of a central processing unit, a read-only memory, a random-access memory, and an input and output circuit. The command section 7 operates in accordance with programs stored in the read-only memory. Prior to practical operation of the robot, preliminary operation of the robot is generally performed under conditions where the hand 2 has no load. As will be made clear hereinafter, the preliminary operation of the robot is to determine unknown coefficients and constants in balance equations representing a relationship between an arbitrary position of the hand 2 and target motor currents allowing the arm arrangement 1 to be balanced in a position corresponding to the arbitrary position of the hand 2. FIG. 4 is a flowchart of a program for the preliminary operation of the robot.

As shown in FIG. 4, a first step 13 of the program derives a target position of the hand 2 from the output signal of the position designation device 6. After the step 13, the program advances to a step 14 which derives an actual position of the hand 2 from the output signals from the position sensors 10X-10Z. A step 15 following the step 14 calculates a difference between the target and the actual positions of the hand 2. A step 16 following the step 15 calculates command values of the motor currents on the basis of the position difference. In general, each of the motor current command values equals the corresponding component of the position difference multiplied by a predetermined constant. A step 17 following the step 16 outputs signals to the current controllers 8X-8Z which represent the calculated motor current command values. As a result, the current controllers 8X-8Z adjust the actual motor currents to the command values. A step 18 following the step 17 determines whether or not the position difference equals zero, that is, whether or not the actual position of the hand 2 equals the target position of the hand 2 designated by the output signal from the position designation device 6. When the position difference differs from zero, the program returns from the step 18 to the step 14. When the position difference equals zero, the program advances from the step 18 to a step 19. Accordingly, the steps 14-18 are reiterated until the actual position of the hand 2 equals the target position of the hand 2. The step 19 stores the command values of the motor currents into the memory 12. In addition, the step 19 stores the corresponding position of the hand 2 into the memory 12. Accordingly, the memory 12 holds data of the target position of the hand 2 and also data of the motor current command values at which the hand 2 is fixed in the target position.

After the step 19, steps similar to the steps 13-19 are executed in respect of a subsequent target position of the hand 2 designated by the output signal from the position designation device 6. This process is reiterated for the respective target positions of the hand 2. Accordingly, the memory 12 finally holds data of all the target positions of the hand 2 and data of all the motor current command values at which the hand 2 is fixed in the respective target positions. When the process ends in respect of the final target position, the program advances to a step 20.

Each set of the motor current command values stored in the memory 12 correspond to power outputs of the motors 9X-9Z which balance the gravity on the arm arrangement 1 in the position corresponding to the related target position of the hand 2.

The step 20 activates the calculator 11 and transfers the data of the target positions of the hand 2 and the data of the motor current command values to the calculator 11. In the calculator 11, a set of one target position and the corresponding motor current command values are substituted for variables in balance equations as follows.

$$Fx = K11 \cdot x + K12 \cdot y + K13 \cdot z + Fxo$$

$$Fy = K21 \cdot x + K22 \cdot y + K23 \cdot z + Fyo \qquad (1)$$

$$Fz = K31 \cdot x + K32 \cdot y + K33 \cdot z + Fzo$$

where the characters Fx, Fy, and Fz denote variables corresponding to the motor current command values respectively; the characters x, y, and z denote variables corresponding to respective components of the target position of the hand 2; the characters K11-K33 denote coefficients; and the characters Fxo, Fyo, Fzo denotes offset values in the X, Y, and Z directions respectively. The data of the target position are substituted for the variables x, y, and z in the equations (1). The data of the motor current command values are substituted for the variables Fx, Fy, and Fz in the equations (1). Accordingly, simultaneous equations for unknown values K11-K33, and Fxo-Fzo are obtained. A similar process is performed for each set of another target position and the corresponding motor current command values so that other simultaneous equations are obtained. The calculator 11 determines the values K11-K33, and Fxo-Fzo by solving the obtained simultaneous equations. The number of predetermined target positions is prechosen so that the values K11-K33, and Fxo-Fzo can be determined. The step 20 transfers the calculated values K11-K33, and Fxo-Fzo from the calculator 11 to the memory 12.

During practical operation of the robot which follows the preliminary operation of the robot, when the hand 2 is ordered to stay at a given position, the command section 7 calculates desired motor current command values Fx, Fy, and Fz by referring to the equations (1) and substituting the components of the given position for x, y, and z in the equations (1). In this case, the values K11-K13, and Fxo-Fzo are fed from the memory 12. The command section 7 controls actual motor current command values on the basis of the desired motor current command values. Specifically, the actual motor current command values equal the sum of the desired motor current command values and feedback components derived via the feedback control system moving the hand 2 toward the given position. Accordingly, the hand 2 is quickly moved into and reliably held at the given position. It should be noted that the desired motor current command values correspond to power outputs of the motors 9X-9Z which balance the gravity on the arm arrangement 1 in the position corresponding to the given position of the hand 2.

Figure 5:
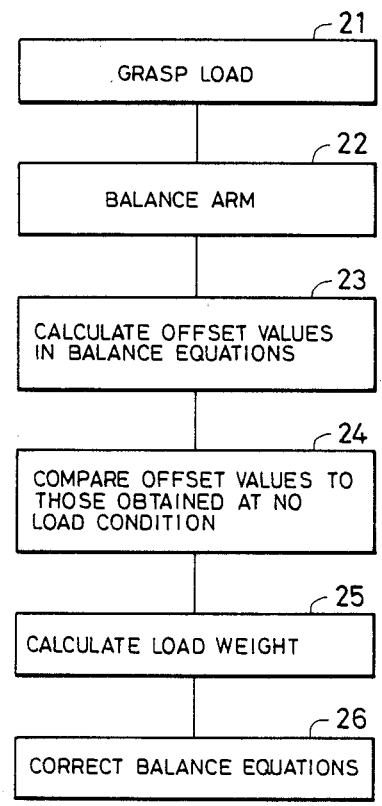
FIG. 5 is a flowchart of a program operating the command section of FIG. 3 when the hand has a load.

FIG. 5 is a flowchart of a program for preliminary operation of the robot under conditions where the hand 2 holds an object or load. As shown in FIG. 5, at a first block 21, the solenoid valve 2A is ordered to allow the hand 2 to grasp the load. A block 22 following the block 21 balances the arm arrangement 1 in a given position. The block 22 has internal steps similar to the steps 13-19 of FIG. 4. During a block 23 following the block 22, the components of the given position are substituted for the variables x, y, and z in the balance equations (1) and the motor current command values which balance the arm arrangement 1 in the given position are substituted for the values Fx, Fy, and Fz in the balance equations (1) so that new offset values Fxo, Fyo, and Fzo are determined. It should be noted that the values of the coefficients K11-K33 calculated in the flowchart of FIG. 4 are used in the process of the block 23. A block 24 compare the net offset values Fxo, Fyo, and Fzo to the respective original offset values given in the flowchart of FIG. 4 where the hand 2 has no load. Specifically, the differences between the new offset values and the original offset values are calculated. After the block 24, the program advances to a block 26 via a block 25. The block 26 corrects the balance equations (1) by replacing the original offset values with the new offset values given in the block 23. In the block 25, the load weight Fg is calculated on the basis of the difference $\Delta Fzo$ between the new and original offset values Fzo by referring to the following equation.

$$Fg = K \cdot \Delta Fzo \qquad (2)$$

where the character K denotes a preset constant. The determined load weight Fg is used in control of the arm arrangement 1 during practical operation of the robot following the preliminary operation. The use of the load weight Fg improves the characteristics of the control of the arm arrangement 1.

Since the arm arrangement 1 is basically composed of a parallelogrammic linkage and thus the load essentially concentrates on an end of the arm arrangement 1, only the offset values Fxo-Fzo considerably vary from those obtained during the conditions where the hand 2 has no load. In general, since the Z direction extends vertically and thus the component Fzo is proportional to the load weight, the load weight can be determined in accordance with only the component Fzo.

In a modification to the previously-mentioned embodiment, the calculator 11 (see FIG. 3) is removed and the step 20 (see FIG. 4) is omitted. In this modification, the preliminary operation of the robot produces a memory map or table in which a set of values of the motor current command values balancing the arm arrangement 1 are plotted as a function of the position of the hand 2. The table is stored in the memory 12 (see FIG. 3). It is desirable to increase the number of the predetermined target positions of the hand 2 at which the arm arrangement 1 is balanced. During the practical operation of the robot, the command section 7 (see FIG. 3) refers to the table in determining desired motor current values which allow the arm arrangement 1 to be balanced in a given position. A known interpolation technique may be used in the determination of desired motor current values on the basis of the table.

What is claimed is:

1. An industrial robot comprising:
    (a) a movable arm;
    (b) an electric motor dirving the arm;
    (c) means for controlling a current flowing through the motor, and moving the arm into predetermined positions and balancing the arm in the predetermined positions sequentially;
    (d) means for memorizing values of the motor current at which the arm is balanced in the respective predetermined positions;
    (e) means for calculating a target value of the motor current on the basis of the memorized motor current values, the target motor current value allowing the arm to be balanced in a given position.

2. The industrial robot of claim 1 wherein the calculating means comprises:
    (a) means for determining coefficients in a predetermined equation in accordance with the memorized motor current values, the predetermined equation representing a relationship between a target value of the motor current and a given position of the arm; and (b) means for using the predetermined equation and thereby determining the target value of the motor current in accordance with the given position of the arm.

3. An industrial robot comprising:
   (a) a movable arm;
   (b) an electric motor driving the arm;
   (c) means for controlling a current flowing through the motor, and moving the arm into predetermined positions and balancing the arm in the predetermined positions sequentially;
   (d) means for memorizing values of the motor current at which the arm is balanced in the respective predetermined positions;
   (e) means for calculating a target value of the motor current on the basis of the memorized motor current values, the target motor current value allowing the arm to be balanced in a given position;
   (f) means for, when the arm holds a load, detecting an actual value of the motor current at which the arm with the load is balanced in the given position;
   (g) means for comparing the target and actual motor current values; and
   (h) means for correcting the memorized motor current values in accordance with the comparison between the target and actual motor current values.

4. The industrial robot of claim 3 wherein the calculating means comrises:
   (a) means for determining coefficients in a predetermined equation in accordance with the memorized motor current values, the predetermined equation representing a relationship between a target value of the motor current and a given position of the arm; and
   (b) means for using the predetermined equation and thereby determining the target value of the motor current in accordance with the given position of the arm;
and wherein the correcting means comprises:
   (a) means for correcting the determined coefficients in the predetermined equation in accordance with the comparison between the target and actual motor current values.

5. An industrial robot comprising:
   (a) a movable arm;
   (b) an electric motor driving the arm;
   (c) means for controlling a current flowing through the motor, and moving the arm into predetermined positions and holding the arm in the predetermined positions sequentially;
   (d) means for memorizing values of the motor current at which the arm is held in the respective predetermined positions; and
   (e) means for determining a relationship between an arbitrary position of the arm and a corresponding target value of the motor current in accordance with the memorized motor current values and the predetermined positions, the target motor current value allowing the arm to be balanced in the arbitrary position.

6. The industrial robot of claim 5 further comprising:
   (a) means for, when the arm has a load, balancing the arm in a given position;
   (b) means for detecting a value of the motor current at which the arm with the load is balanced in the given position;
   (c) means for calculating a value of the motor current corresponding to the given position in accordance with the determined relationship;
   (d) means for comparing the detected motor current value and the calculated motor current value;
   (e) means for correcting the relationship in accordance with a result of the comparison between the detected motor current and the calculated motor current.

7. An industrial robot comprising:
   (a) a movable arm;
   (b) an electric motor driving the arm;
   (c) means for controlling a current flowing through the motor, and moving the arm into predetermined positions and balancing the arm in the predetermined positions sequentially;
   (d) means for memorizing values of the motor current at which the arm is balanced in the respective predetermined positions, and for holding a table in which the motor current values are plotted as a function of the position of the arm; and
   (e) means for referring to the table and thereby determining a target value of the motor current which allows the arm to be balanced in a given position.

8. An industrial robot as recited in claim 3 wherein said moveable arm includes a pivoted parallelogramic structure, said means for controlling a current, said means for memorizing values and said means for calculating a target value all operable for performing the respective functions thereof during a preliminary operation; said means for detecting, said means for comparing and said means for correcting all operable for performing the respective functions thereof during a load bearing condition of said arm.

9. An industrial robot as recited in claim 1 wherein said moveable arm comprises a pivoted parallelogramic structure.

10. An industrial robot comprising:
   (a) a moveable arm having a pivoted parallelogramic structure;
   (b) a plurality of electric motors for driving the arm in a plurality of directions in a plurality of dimensions;
   (c) means for controlling currents flowing through the motors, said means operable in a preliminary operation for sequentially moving the arm in an unloaded condition into a number of predetermined positions and for balancing the unloaded arm in each of the predetermined positions, the number of positions selected to provide solutions for a set of balance equations relating balanced position in said plurality of dimensions to currents in said plurality of motors;
   (d) means for memorizing values of motor currents at which the arm is balanced in each of the respective predetermined positions;
   (e) calculating means for calculating a target value for the motor currents to balance the arm at any predetermined position on the basis of the memorized motor current values;
   (f) loaded condition detecting means for detecting actual values of the motor currents at which the arm is balanced in the given position in a loaded condition;
   (g) comparing means for comparing the target and actual motor current values; and
   (h) correcting means for correcting the memorized motor current values in accordance with the comparison between the target and actual motor current values.

11. The industrial robot of claim 10 wherein the calculating means comprises:
(a) coefficient determining means for determining coefficients in said set of balance equations in accordance with the memorized motor current values, wherein said set of balance equations represent a relationship between target values of the motor currents and a given balanced position of the arm; and
(b) means for using said set of equations for determining the target values of the motor currents in accordance with the given position of the arm;
and wherein the correcting means comprises:
(a) coefficient correcting means for correcting the determined coefficients in the predetermined equation in accordance with the comparison between the target and actual motor current values.

12. The industrial robot of claim 11 wherein said coefficient correcting means comprises offset correcting means for correcting an offset coefficient in said set of equations to compensate for a load change on said arm.

* * * * *